Nov. 17, 1942.	E. J. FARKAS ET AL	2,302,013
STARTER GEAR
Filed March 14, 1941	2 Sheets-Sheet 1
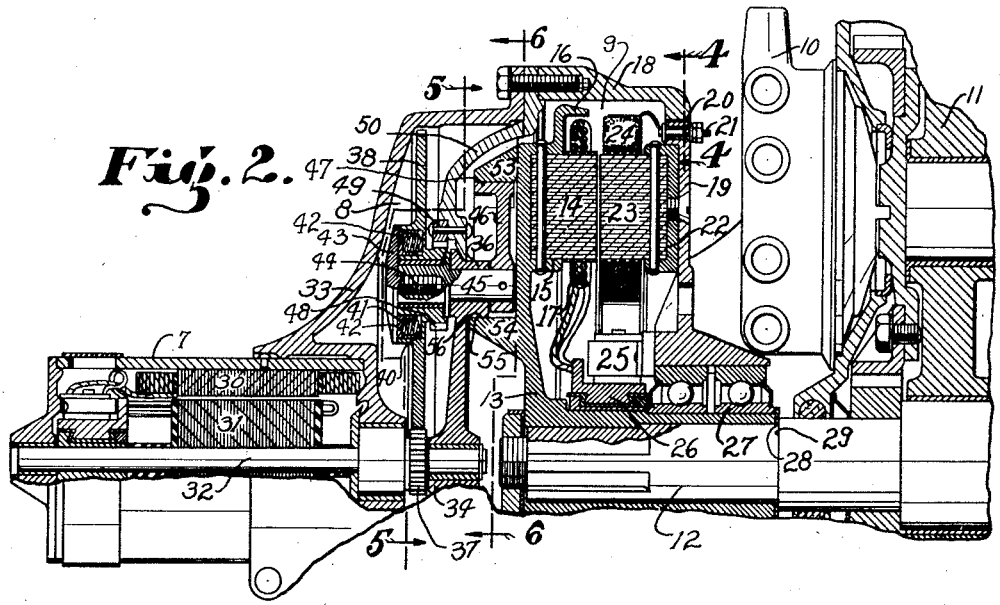
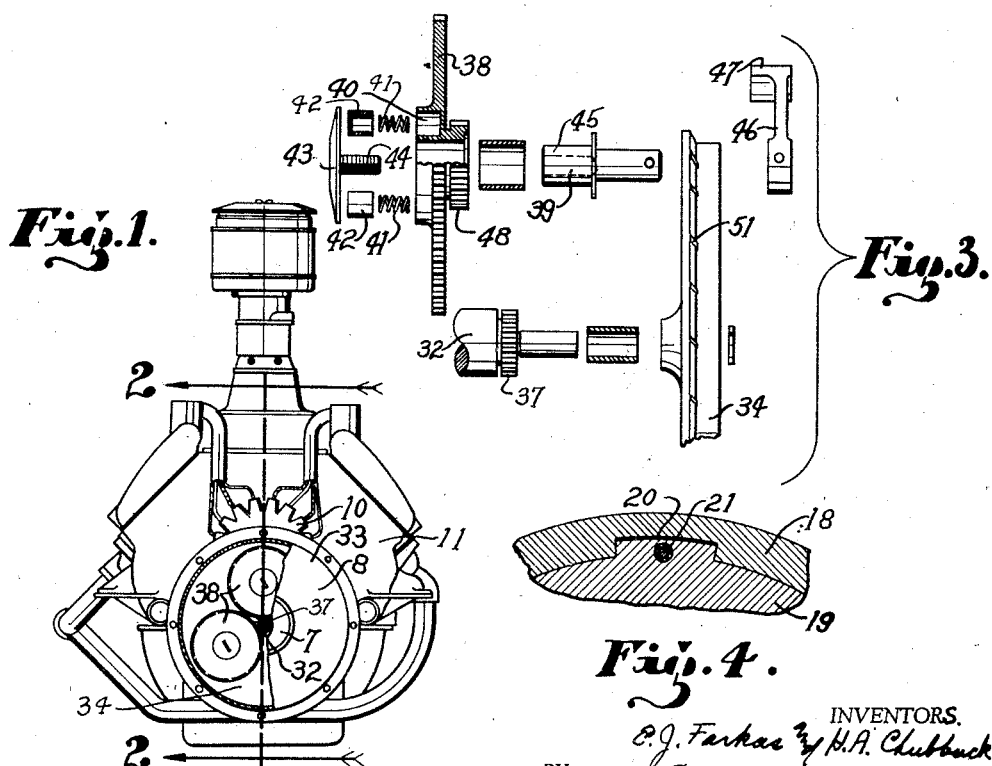

Nov. 17, 1942.     E. J. FARKAS ET AL     2,302,013

STARTER GEAR

Filed March 14, 1941     2 Sheets-Sheet 2

Patented Nov. 17, 1942

2,302,013

UNITED STATES PATENT OFFICE 2,302,013

STARTER GEAR

Eugene J. Farkas, Detroit, and Horace A. Chubbuck, Dearborn, Mich., assignors to Ford Motor Company, Dearborn, Mich., a corporation of Delaware Application March 14, 1941, Serial No. 383,360

19 Claims. (Cl. 290—47)

This invention relates to starting devices, and more particularly to those used in connection with internal-combustion engines in automobiles and trucks.

An object of our invention is to provide an improved starter gear and to combine with it a novel form of generator by which elements common to both devices are combined, with consequent saving in space and cost but without any sacrifice of efficiency.

A further object of the invention is to provide a starter gear which normally is entirely disassociated from any moving part of the engine but which, when engaged frictionally therewith, is in a certain sense self-energizing, with the result that the efficiency of the frictional engagement is increased and becomes, in effect, equivalent to a positive connection. Moreover, the starter gear incorporates an adequate speed reduction gearing which at the same time serves the other purposes outlined.

An additional object of the invention is to so arrange the component parts to occupy a minimum of space. In accomplishing this, one element of the combination serves as the flywheel of the engine, as the rotor of the generator, and as the principal element of the starter gear. This permits a further saving in cost and in space requirement and allows a stronger construction.

A further object of the invention is to provide a starting gear in which a plurality of engaging members is provided with the view that so long as one of said engaging members is in operating condition, the starting gear will function satisfactorily, whereby complete failure of the starting gear on the failure of any one such member is obviated.

With these and other objects in view, our invention consists in the arrangement, construction and combination of the various parts of our improved device, as described in this specification, claimed in our claims, and illustrated in the accompanying drawings, in which:

Figure 1 is a front elevation of an automobile engine equipped with this invention.

Figure 2 is a vertical sectional view taken on the line 2—2 of Figure 1 extending through the mechanism forming this invention.

Figure 3 is an exploded view of the clutch mechanism and frictional element used in the invention.

Figure 4 is a partial section taken on the line 4—4 of Figure 2.

Figure 1 shows the preferred location of the device of this invention, that is, mounted in the front of an internal-combustion engine and substantially aligned with the crankshaft thereof.

Figure 5:
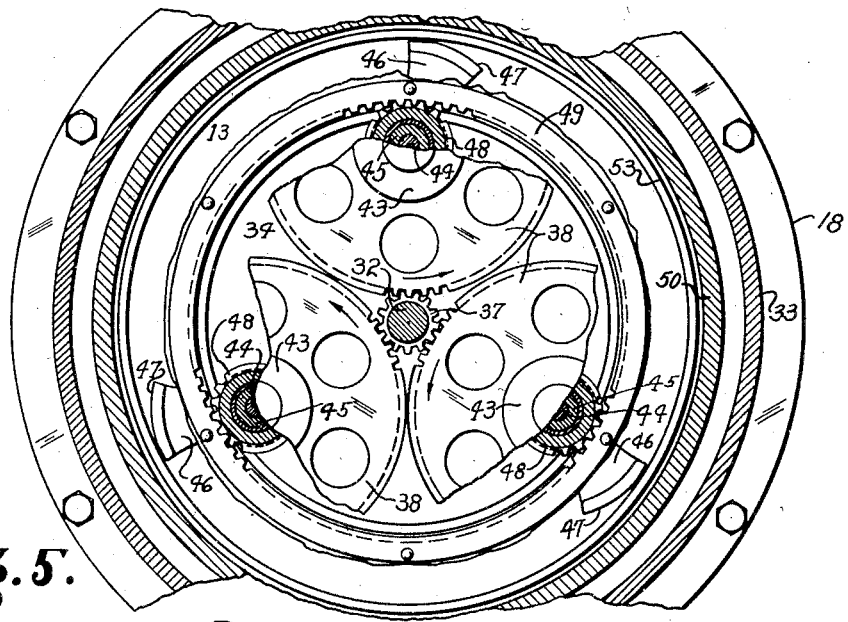
Figure 5 is a transverse section taken on the line 5—5 of Figure 2 and showing the starter gear in the disengaged position.
Figure 6:
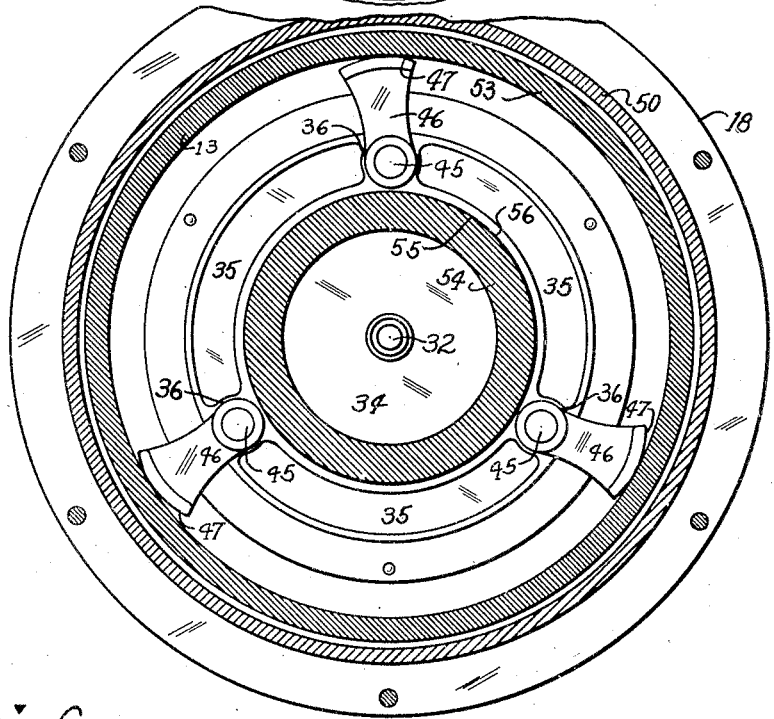
Figure 6 is a transverse section taken on the line 6—6 of Figure 2 and showing the starter gear in the engaged position.

In Figure 2, only the upper half of the starter gear and the generator is shown but it will be understood that the lower half is symmetrical therewith, as reference to Figures 5 and 6 will indicate, and its inclusion would be merely repetitive. In addition, in Figures 1 and 5 portions of overlying mechanisms have been broken away to more clearly show the structure underneath.

Referring to the accompanying drawings, Figure 2 shows the general assembly of a preferred embodiment in which, from left to right, there is the starter motor 7, starter mechanism 8, generator 9, distributor 10 and motor block 11. These latter two elements form no part of this invention and are included merely to show the relationship of the various parts. The crankshaft 12 of the engine has splined thereon at its front end the disc 13, which serves as the rotor of the generator, as a flywheel for the engine and as a part of the starter gear. On the right side of the disc is the armature core 14, which is in the form of a ring and is secured in the circular channel 15. At the periphery of the disc is an overhang 16 which protects the armature winding 17 and prevents it being displaced by centrifugal force during the operation of the rotor. The generator is enclosed in a main housing ring 18 which may be integral with the motor block and to which is splined the stator 19 at 20, as shown more clearly in Figure 4. The stator carries the binding post 21 which serves as an outlet for the generator field circuit. Secured to the stator is a circular channel 22 which partially encloses the ring-shaped stator core 23 carrying the field winding 24. Also carried by the stator is a plurality of brushes such as 25 mounted in suitable brush holders and having contact with the commutator 26 which is secured on the disc 13. The stator also includes bearings 27 which support the end of the crankshaft and the weight of the flywheel, etc. The right-hand end 28 of the rotor assembly, in conjunction with the shoulder 29 on the shaft, acts as a spacing device by which the air gap between the field and armature cores may be closely regulated. It will be noted that the stator 19, by reason of the spline connection 20 with the housing 18, may move slightly longitudinally of the shaft; and, as a result, by the choice of suitable shims at shoulder 29, the air gap may be carefully controlled.

The starter motor 7 is of the conventional type having a field member 30 and armature 31, which is mounted on and rotates with a drive shaft 32. The motor is supported by the housing extension 33 which is secured to the housing ring 18. At the inner end of the drive shaft 32 is mounted the spider plate 34 on a suitable bushing. The spider plate has a circular channel 35 interrupted at regular intervals, in this case three, by bearing bosses 36. Also mounted on the drive shaft 32 and secured thereto is the pinion 37 which meshes with the three primary planetary gears 38.

Referring now to Figure 3, which is an exploded view, it will be seen that the hubs of these planetary gears are provided with a number of spaced recesses 40 in each of which is disposed a spring 41 and a cap 42 which, when assembled, bear resiliently on the clutch plate 43. Each primary planetary gear 38 is mounted on one end of a stub-shaft 45 which is tapped as at 39 to receive the screw 44 carried by the clutch plate 43. The stub-shaft 45 is then mounted in a bearing 36 on the spider plate 34 and a dog 46 is pinned thereon. This dog is provided with a friction surface 47 and its general configuration may be seen to best advantage in Figure 6.

On the right-hand side of each of the primary planetary gears 38 is formed a secondary planetary gear 48 which engages an internal ring gear 49 secured to the inner housing ring 50, as shown in Figure 2. The inner edge of this housing ring is formed to cooperate with a peripheral flange on the spider plate 34, said flange having a number of vanes 51 which act as oil slingers, and together serve as an oil lock preventing the lubricating fluid in the left or gear compartment from seeping through to the right or friction compartment.

Returning now to the disc 13, it will be noted that the left-hand side thereof is also formed with a circular channel outlined by the outer flange 53 and the inner flange 54. The parts are so proportioned that the frictional surface 47 of the dog 46 will be forced into frictional engagement with the inner surface of flange 53 as the dog is rotated. Similarly, the outer surface 55 of the flange 54 is designed to cooperate with a locking surface 56 formed on the spider plate 34. The clearance between these two latter surfaces, namely 55 and 56, is kept to a practicable minimum for a purpose which will appear later.

It is believed that the operation of the device will be readily apparent. When it is desired to start the engine, an electrical impulse is applied to the starting motor in the usual fashion. This causes the drive shaft 32 and pinion 37 to rotate. The rotation of the pinion causes a corresponding rotation of the primary planetary gears 38 about their respective axes and, consequently, a similar rotation of the secondary planetary gears 48. These latter gears, meshing with the internal ring gear 49, cause the revolution of the planetary gears about the axis of the drive shaft and said planetary gears carry with them the spider plate 34 which rotates about said drive shaft.

Concurrently with the rotation of a planetary gear, the stub-shaft 45 is rotated therewith through the friction clutch formed by the interaction of the spring 41, the cap 42 and the clutch plate 43. As the stub-shaft rotates, the dog 46 pinned thereon is also turned and the friction surface 47 of the dog engages the inner surface of the flange 53. Reference to Figures 5 and 6 shows this action. In Figure 5, the parts are shown in a disengaged position such as exists before the starter motor is operated. Figure 6, on the other hand, shows the starting mechanism in the engaged position in which the dogs have been rotated and are in frictional engagement with the bearing surface referred to.

It will be understood that so long as the starter motor continues operating, the rotation of the spider plate 34 will continue; and so long as the dogs carried thereby have frictional engagement with the disc 13, the said disc will be rotated as well. As the disc is secured to the engine crankshaft 12, the crankshaft will be rotated and as a result starting impetus will be given the engine, to which the fuel has been admitted and the ignition thereof arranged in the usual manner.

One of the principal advantages of the arrangement which has been used is that when the dogs 46 engage with the disc 13 and are placed under load thereby, the spider 34 will be flexed slightly. As has been noted previously, the clearance between the bearing surfaces 55 and 56 is kept to a minimum. When this flexing occurs, these two surfaces will enter into frictional engagement and additional forces will be exerted thereby, tending to prevent slipping between the starter and disc. When this frictional engagement occurs, it is apparent that no further rotation of the dogs is possible. Consequently, the rotation of the stub-shaft 45 also must stop. Under such conditions, the clutch, which is formed by the parts 40, 41, 42 and 43 referred to previously, comes into action, permitting revolution of the stub-shaft without its rotating.

The operation of the starting motor is continued until such time as the engine starts and begins to operate under its own power. As the engine picks up speed, its crankshaft and the disc 13 will rotate at a speed considerably higher than that of the spider plate 34. When the speed of the disc exceeds that of the spider, the dogs will be automatically disengaged from their frictional engagement and the flexing of the spider will be relieved, releasing the engagement of surfaces 55 and 56. After this point, the starting motor is stopped and movement of the starter components ceases. The operation of the engine is then entirely distinct from and has no connection with the mechanism of the starter.

In the mechanism that has been described herein, three planetary gears and three dogs have been shown. One such arrangement would be adequate as a starting device, but by using three of them the opportunity for damage is less and, in the event of failure of any one of them, the starting gear may still be operated satisfactorily. The planetary gearing shown has the further advantage that a suitable speed reduction is provided for the starter motor, permitting the use of the usual high speed, low torque motor; and at the same time, this gearing has the additional function of serving as a part of the starting disengaging gear.

Some changes may be made in the arrangement, construction and combination of the various parts of our improved device without departing from the spirit of our invention, and it is our intention to cover by our claims such changes as may be reasonably included in the scope thereof.

We claim as our invention:

1. In a starting gear for an internal-combustion engine having a crankshaft, a flywheel thereon, a starting motor mounted on said engine in substantial alignment with said crankshaft, a supporting means mounted for rotation on the shaft of said starting motor, planetary gearing means between said motor and said supporting means, frictional engaging means carried by said supporting means, said engaging means being operable by said gear means, said frictional means being adapted to engage said flywheel when said starter motor is operated.

2. In combination of the claims in claim 1, which is further characterized in that the frictional means, when engaged, is adapted to flex said supporting means, whereby said flywheel is engaged both by the frictional means and by said supporting means.

3. In an internal-combustion engine, in combination, a crankshaft, a disc secured to said crankshaft, a circular channel on one side of said disc, a starting motor mounted on said engine and having its shaft in substantial alignment with the axis of said crankshaft, a spider plate rotatably mounted on said motor shaft, means carried by said spider plate for frictional engagement of said flywheel, planetary gearing operated by said motor and carried by said spider by which said spider and said frictional means are independently rotated, clutch means between said planetary gearing and said frictional engaging means, whereby said frictional engaging means is mounted for positive revolution about the axis of said motor shaft and for releasable rotation about the axis of said clutch.

4. The structure of claim 3, which is further characterized in that said frictional engaging means is mounted on a shaft carried by said spider and secured to said clutch and that on operation of said starting motor said frictional engaging means is brought into contact with one wall of said channel, said spider plate being flexed thereby and auxiliary frictional engaging means on said spider adapted to be brought into contact with the other wall of said channel thereby.

5. A starting gear for an internal-combustion engine having a crankshaft, a flywheel thereon, circular engaging surfaces on one side of said flywheel, a starting motor having a shaft, a spider plate rotatably mounted on said motor shaft, a pinion secured to said motor shaft, planetary gears engaging said pinion and arranged for revolution about said starting motor shaft, stub-shafts mounted in said planetary gears and extending through said spider plate whereby said stub-shafts are adapted for axial rotation and for revolution about said motor shaft, clutch means disposed between said planetary gears and said stub-shafts whereby said stub-shafts are urged to rotate with said planetary gears, frictional dogs secured to said stub-shafts, said dogs being arranged for revolution about said motor shaft and for rotation about the axes of said stub-shafts, said dogs engaging one of said engaging surfaces on said flywheel, a frictional engaging surface on said spider designed to cooperate with the other of said engaging surfaces on said flywheel, whereby on operation of said starting motor said dogs will be rotated into frictional engagement with one said engaging surface on said flywheel and after such engagement will cease rotation and will tend to flex said spider plate, engaging said frictional engaging surface thereon with the other said engaging surface on said flywheel.

6. In an internal-combustion engine, in combination, a housing, a crankshaft, a starter motor having a drive shaft, a flywheel secured to said crankshaft, said flywheel having concentric frictional surfaces thereon, a plate rotatably supported on said drive shaft, a pinion secured to said drive shaft, a plurality of primary planetary gears engaging said pinion, each of said planetary gears having a stub-shaft connected for rotation therewith through a clutch, said stub-shaft extending through said plate, a dog secured to each stub-shaft, said dog designed to engage one of said frictional surfaces on said flywheel, a frictional engaging surface on said plate, said plate surface designed to engage the other of said frictional surfaces on said flywheel, secondary planetary gears, and a ring gear secured to said housing, meshing with said secondary planetary gears.

7. In an internal-combustion engine, in combination, a crankshaft, a housing member secured to said engine, a support engaging said housing and arranged for limited axial movement, a disc secured to said crankshaft, a generator armature and field member secured on opposing faces of said disc and said support respectively, concentric bearing surfaces on the other side of said disc, a starting motor substantially aligned with said crankshaft, a spider plate rotatably mounted on the shaft of said motor, planetary gearing operable between said motor shaft and said housing, a stub-shaft carried by said planetary gearing and said spider plate, clutch means urging said stub-shaft to rotate with said planetary gearing, a dog secured to said stub-shaft and adapted to engage one of said concentric surfaces, a frictional engaging surface on said spider plate adapted to engage with the other of said concentric surfaces, a shoulder on said crankshaft, whereby said disc serves as a flywheel for said engine, as the rotor of said generator, and as the engaging member of said starting gear.

8. In a starter gear, a crankshaft, a disc secured to said crankshaft and having spaced engaging surfaces, a support rotatably mounted on said motor shaft, a pinion on said shaft, a stub-shaft carried on said support, a ring gear, a gear mounted on said stub-shaft and meshing with said pinion and said ring gear, clutch means between said gear and said stub-shaft, and a frictional means secured to said stub-shaft and adapted to engage one of said spaced surfaces, and an engaging surface on said support adapted to engage the other of said spaced surfaces.

9. In an internal-combustion engine, a crankshaft, a disc secured to said crankshaft, a housing enclosing said disc, spaced frictional engaging surfaces on one face of said disc, a circular channel on the other face of said disc, and a peripheral overhang on said disc, whereby said disc is adapted to serve as a flywheel of said engine, said frictional surfaces to be engaged by a starting gear, and a ring-shaped generator armature disposed in said channel.

10. In an internal-combustion engine, a housing comprising a peripheral ring, a plate forming one end of said housing and mounted for limited axial motion with respect thereto, a cover rigidly secured to the other side of said ring, and an intermediate partition having oil sealing means thereon, whereby said housing is adapted to form a protective covering for a generator and a frictional starting gear in one said compartment and a gear chamber in the other said compartment, for the purpose described.

EUGENE J. FARKAS.
HORACE A. CHUBBUCK.